United States Patent [19]

Cook

[11] 4,163,543
[45] Aug. 7, 1979

[54] AIR CONTROL VALVE

[75] Inventor: John E. Cook, Chatham, Canada

[73] Assignee: Fram Corporation, East Providence, R.I.

[21] Appl. No.: 831,217

[22] Filed: Sep. 7, 1977

[51] Int. Cl.² .............................................. F16k 31/126
[52] U.S. Cl. ........................................ 251/48; 60/290;
 60/306; 92/95; 251/61.5
[58] Field of Search ...................... 60/290, 306; 92/50,
 92/94, 95; 251/48, 61.4, 61.5, 63.4, 77

[56] References Cited

U.S. PATENT DOCUMENTS

| | | | |
|---|---|---|---|
| 1,373,599 | 4/1921 | Clark | 251/63.4 |
| 2,969,776 | 7/1961 | Riester | 92/94 |
| 3,036,809 | 5/1962 | Kerr | 251/77 |
| 3,321,173 | 5/1967 | Seger | 251/61.5 |
| 3,461,913 | 8/1969 | Scott | 251/61.5 |
| 3,479,816 | 11/1969 | Masters | 60/290 |
| 3,603,558 | 9/1971 | Cripe | 251/61.5 |
| 3,662,540 | 5/1972 | Murphey | 60/301 |
| 3,869,858 | 3/1975 | Goto et al. | 60/306 |
| 3,905,193 | 9/1975 | Heilman et al. | 60/290 |
| 3,921,396 | 11/1975 | Nohira | 60/306 |
| 3,955,364 | 5/1976 | Lewis | 60/290 |
| 3,971,212 | 7/1976 | Morita | 60/306 |
| 3,983,697 | 10/1976 | Goto et al. | 60/306 |

FOREIGN PATENT DOCUMENTS 2550406  5/1977  Fed. Rep. of Germany ............. 60/290

Primary Examiner—William R. Cline
Assistant Examiner—G. L. Walton
Attorney, Agent, or Firm—Ken C. Decker; William N. Antonis

[57] ABSTRACT

An air control valve for a vehicle emissions control system has an inlet connected to the output of the vehicle air pump, a first outlet connected to exhaust injection passages in cylinder head, and a second outlet connected downstream into the exhaust manifold. A vacuum actuated valve element is responsive to engine manifold vacuum to divert the output of the air pump from the downstream injection point to the upstream injection point during cold engine operation. However, the air supply from the air pump is diverted from the upstream injection point to the downsteam injection point for a few seconds when a sudden increase in manifold vacuum occurs, such as during engine deceleration when the engine is cold. After the engine warms up, the air supply from the air pump is continuously communicated to the downstream injection point.

9 Claims, 1 Drawing Figure

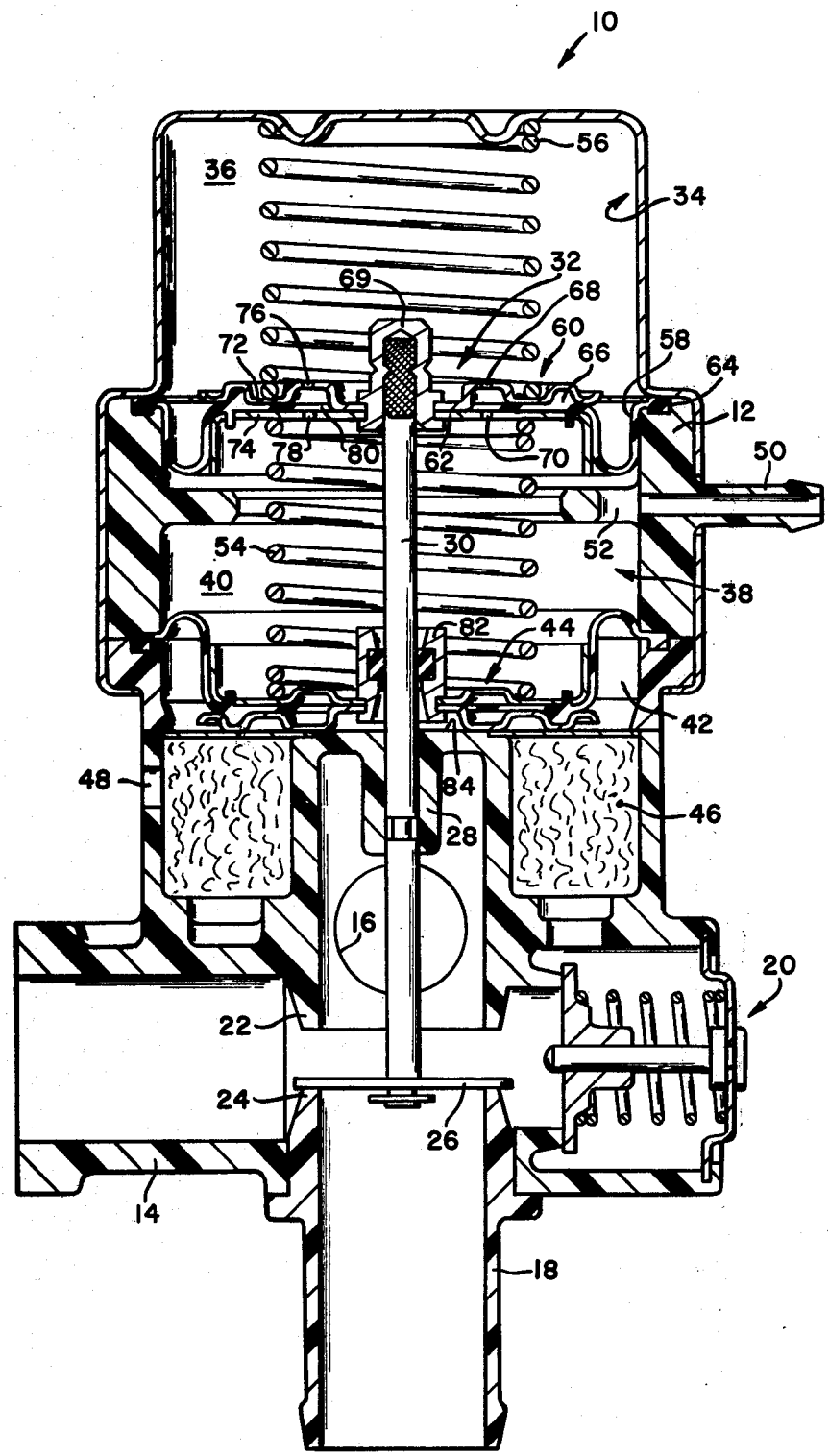

AIR CONTROL VALVE

BACKGROUND OF THE INVENTION

This invention relates to an air control valve for use in a vehicle emissions control system.

Modern automobiles are equipped with catalytic converters to control emissions. In order to meet increasingly stringent governmental requirements, it is necessary to inject air supplied from an engine operated air pump to the engine exhaust stream. The air supply must be supplied to different points in the exhaust stream, depending upon the vehicle operating conditions. For example, when the vehicle engine is warm, the air supply is injected downstream into the exhaust manifold, but when the vehicle engine is cold, the air supply is normally injected upstream closer to the combustion chamber. However, even during cold engine operation, the air supply must be momentarily diverted from the upstream injection point to the downstream injection point when the vehicle is decelerated. After a time period of a few seconds, the injection returns to the upstream injection point regardless of whether or not the vehicle is still decelerating. In order to accomplish the relatively complicated diverting functions required, prior art air control valves were relatively complicated, and, accordingly, were rather bulky, expensive, and heavy. Furthermore, these prior art valves required two vacuum signal connections between the valve and engine manifold vacuum.

The present invention provides a unique two piston actuated valve, which requires only a signal vacuum connection. The actuating piston is connected directly to the valve element. The auxiliary piston is shifted in response to the vacuum communication to the valve, and remains in the shifted position as long as the vacuum signal remains. The actuator piston is provided with a check valve, which permits uninhibited communication across the piston in one direction, and restricted communication in the other direction. Accordingly, when the vacuum signal increases to a predetermined amount more than that required to actuate the valve, the actuator piston will deflect, thereby actuating the valve element, for a few seconds until the pressure is equalized across the actuator piston, and thereafter will return to a position communicating the air supply to the upstream injection point.

SUMMARY OF THE INVENTION

Therefore, an important object of my invention is to provide an air control valve for a vehicle emissions control system which is more compact, lighter in weight, and, accordingly, less expensive than prior art air control valves.

Another important object of my invention is to provide an air control valve for a vehicle emissions control system which requires only one vacuum signal connection with the engine manifold.

Still another important object of my invention is to provide an air control valve for a vehicle emissions control system which is capable of diverting the air supply generated by the vehicle air pump from upstream to downstream injection points with flow pressures up to the valve relief pressure.

DESCRIPTION OF THE DRAWING

The single FIGURE of the drawing is a longitudinal cross-sectional view of an air control valve made pursuant to the teachings of my present invention.

DETAILED DESCRIPTION

Referring now to the drawing, an air control valve generally indicated by the numeral 10 includes a housing 12 having an inlet port 14 connected to the output of a conventional vehicle air pump (not shown), a first outlet 16 connected downstream in the exhaust stream, and a second outlet 18 connected upstream closer to the combustion chamber. A relief valve generally indicated by the numeral 20 vents the inlet port 14 to atmosphere when an overpressure condition exists. The relief valve 20 is conventional, and will not be described in detail herein.

A pair of axially opposed valve seats 22, 24 are provided on the housing 12 which cooperate with a valve element 26 to control communication to the outlets 16 and 18 respectively. The housing 12 is provided with a guide 28 which slidably receives an actuating rod 30. One end of the actuating rod 30 is connected to the valve element 26, and the other end of the rod 30 is connected to an actuating piston assembly generally indicated by the numeral 32. The piston 32 is slidably disposed within a chamber 34 defined within the housing 12, and divides the latter into an upper section 36 and a lower section 38. The lower section 38 of the chamber 34 is divided into an upper compartment 40 and a lower compartment 42 by an auxilliary piston generally indicated by the numeral 44 which is also slidably mounted in the chamber 34. The lower compartment 42 is communicated to atmospheric pressure through silencing material 46 and opening 48. The upper compartment 40, which is defined between the pistons 32 and 44, is provided with a vacuum port 50. The vacuum port 50 is connected to manifold vacuum through a conventional temperature responsive valve (not shown), which communicates the port 50 to manifold vacuum when the engine is cold, and communicates the port 50 to atmospheric pressure when the engine has warmed up. Since the temperature control valve is conventional and forms no part of the present invention, it will not be described in detail herein. Housing 12 further includes a circumferentially extending, radially projecting piston stop 52 which projects into the upper compartment 40. A lower spring 54 disposed between the pistons 32 and 44 is maintained in compression by the action of an upper spring 56 located in the section 36 of chamber 34 when substantially atmospheric pressure exists across the pistons 32 and 44.

The piston 32 includes a circumferentially extending rubber diaphragm 58, an upper plate 60, and a lower plate 62. The outer circumferential edge of the diaphragm 58 terminates in a bead 64 which is clamped to the wall of the housing 12, and another circumferentially extending bead 66 of the diaphragm 58 radially offset from the bead 66 is clamped between the upper and lower plates 60 and 62. The piston 32 carries an axially located sleeve 69 which secures the piston to the actuating rod 30. The upper and lower plates 60 and 62 are provided with raised portions 68, 70 and flat portions 72, 74 respectively. Openings 76 are provided in the raised portions of the upper plate 60, and openings 78 are provided in the flat portions 74 of the lower plate 62 respectively. The inner circumferential portion of the diaphragm 58 extends into the portions defined between the plates 60 and 62 which carry the openings 76 and 78, but the inner circumferential edge 80 of the diaphragm 58 is not attached to the plates, so that it may deflect to permit communications through the openings 76 and 78. As illustrated in the drawing, the raised portions 68 on the upper plate are opposite the openings 78 in the lower plate 62. Since the inner circumferential edge 80 of the diaphragm 58 is free to deflect into the raised portions 68, substantially uninhibited communication is permitted from the compartment 40 into the section 36 of the chamber 34. However, since the raised portions 70 of the lower plate 62 are offset from the openings 78 in the flat portions of the lower plate, a lower pressure in compartment 40 will deflect the portion 80 of the diaphragm 58 to permit restricted communication through the openings 78 to thereby permit pressure equalization between section 36 and compartment 40 only after a predetermined time period has elapsed. The piston 44 is constructed similarly to the construction of the piston 32, but, of course, the openings 76 and 78 are not provided in the auxilliary piston 44, so that fluid communication thereacross is prevented. A guide 82 is provided in lieu of the sleeve 69, so that the piston 44 is maintained coaxial with the piston 32, and is able to slide within the chamber 34 relative to the rod 30 and piston 32.

MODE OF OPERATION

Various components of the air control valve 10 are illustrated in the FIGURE in the positions which they assume when substantially atmospheric pressure exists across the pistons 32 and 44. This condition exists before the vehicle engine is started, and after the vehicle engine has warmed up. In this condition, the springs 54 and 56 bias the piston 32 downwardly, to maintain the valve element 26 sealingly engaged with the valve seat 24, to thereby prevent communication from the inlet port 14 and the outlet port 18 and to permit communication between the inlet port 14 and the outlet port 16. The spring 54 maintains the auxiliary piston 44 in engagment with the lower wall 84 of the chamber 34. When the vehicle engine is started, the aforementioned temperature responsive valve (not shown) opens to communicate the port 50 with engine manifold vacuum. When this occurs, the pressure in the compartment 40 will be reduced. Since compartment 42 is always communicated to atmospheric pressure, the vacuum level created in the compartment 40 will cause the atmospheric pressure to urge the auxiliary piston 44 upwardly viewing the drawing until the piston 44 engages the piston stop 52. During this upward movement of the piston 44, of course, the guide 82 slides relative to the rod 30. Due to the aforementioned restricted communication from the section 36 to the compartment 40 across the piston 32, the piston 32 will remain in the position illustrated for a few seconds after the vacuum signal is applied to the port 50. Consequently, upward movement of the piston 44 compresses the lower spring 54. After a few seconds have elapsed, atmospheric pressure in the section 36, due to the restricted communication across the piston 32, attains the same vacuum level as in the compartment 40. When this occurs, the springs 54 and 56 bias the actuating piston 32 upwardly viewing the drawing. This upward movement of the piston 32 is transmitted through the rod 30 to the valve element 26, moving it away from the valve seat 24 to permit communication from the inlet 14 to the outlet 18. The valve element 26 is then moved into sealing engagment with the valve seat 22, to thereby terminate communication between the inlet 14 and the outlet 16. When the vehicle engine warms up, the aforementioned temperature responsive valve again communicates atmospheric pressure into the compartment 40, causing the pistons 32 and 44 to return to the positions illustrated in the drawing, thereby causing the valve element 26 to return into sealing engagement with the valve seat 24.

As described hereinabove, when the engine is cold, the auxiliary piston 44 is moved into engagement with the piston stop 52, and a short time period thereafter the actuating piston 32 is urged upwardly relative to the piston 44 to divert flow from the inlet 14 to the outlet 18. However, when the vehicle is decelerated when the engine is cold, the valve 10 must divert air flow from the inlet 14 back to the outlet 18 for a few seconds. After a few seconds have elapsed, valve 10 then resumes communication between the inlet 14 and outlet 16 assuming, of course, that the engine is not warmed up in the interim to cause the temperature responsive valve to terminate vacuum communication to the port 50.

When the vehicle engine is decelerated, the vacuum signal communicated to the port 50 will increase. When this occurs, the auxiliary piston 44 will, of course, remain in engagement with the stop 52, since the piston 44 remains in engagement with the stop 52 at all times when the vacuum signal communicated to the port 50 is greater than that required to actuate the valve. However, the increased vacuum level in the compartment 40 creates a pressure differential across the actuating piston 32, since the vacuum level in the compartment 40 is now greater than vacuum level existing in the section 36. The lower vacuum level in the compartment 40 pulls the piston 32 downwardly viewing the Figure, to approximately the position illustrated in the drawing. When this occurs, of course, the valve element 26 is brought back into engagment with valve seat 24, causing the air flow entering the inlet 14 to divert to the outlet 16. However, as discussed hereinabove, the restricted communication permitted across the piston 32 will cause the vacuum levels to equalize across the piston after a few seconds. When this occurs, of course, the spring 54 urges the piston 32 back to the upper position, thereby forcing the valve element 26 away from the valve seat 24 and into sealing engagement with the valve seat 22. Consequently, the valve 10 diverts the air flow to the outlet 18 for a few seconds when the vehicle is decelerated when the engine is cold. Of course, after the engine warms up, as discussed hereinabove, the various components of the valve are returned to the positions illustrated in the drawing, so that the air supply is diverted to the port 16.

I claim:

1. In a control valve, a housing defining a pair of chambers, said housing having an inlet and a pair of outlets communicating with one of said chambers, control valve means in said chamber for controlling communication between said inlet and outlets, an actuating rod connected to said control valve means and extending into the other chamber, a pair of pistons slidably mounted in said other chamber and cooperating with said housing to define a first section between one of said pistons and a corresponding end of said other chamber, a second section between the other piston and the corresponding end of said other chamber and a third section between said pistons, said one piston being fixedly secured to said actuating rod, said other piston being slidable relative to said actuating rod, means communicating a substantially constant reference pressure to the first and second sections and a variable pressure signal to said third section, and yieldable means interconnecting said pistons and urging said one piston a predetermined distance away from the other piston for a corresponding predetermined value of said pressure signal, but permitting said one piston to move toward the other piston when variations in said pressure signal increase the pressure differential across said one piston.

2. The invention of claim 1:
said reference pressure being atmospheric pressure, said variable pressure signal being a vacuum.

3. The invention of claim 2:
wherein said other piston carries a guide slidably receiving the actuating rod.

4. The invention of claim 2:
and a piston stop in said third section, said other piston moving into engagement with said piston stop when said pressure signal is communicated to said third section to thereby create a pressure differential across said other piston.

5. The invention of claim 4:
and timing valve means carried by said one piston for controlling communication between said first and third sections to permit restricted communication therebetween.

6. The invention of claim 4:
said one piston being moved from a first position to a second position due to the action of said yieldable means upon movement of the other piston into engagement with said stop, said one piston being responsive to a change in said pressure signal generating a pressure differential across said one piston to return to said first position, means carried by said one piston for equalizing the pressures thereacross after a predetermined time period whereupon said piston moves to said second position.

7. The invention of claim 6:
said means for equalizing pressures including timing valve means permitting restricted communication across said one piston.

8. The invention of claim 6:
and spring means acting on said one piston on opposition to said yieldable means.

9. The invention of claim 6:
said control valve means including a pair of valve seats, each of said valve seats being associated with a corresponding one of said outlets and controlling communication thereto, a valve element movable between said valve seats and sealingly engageable with either of the valve seats, said valve element being secured to said actuating rod, said first position of said one piston being defined when the valve element is sealingly engaged with one of the valve seats, said second position of said one piston being defined when the valve element is sealingly engaged with the other valve seat.

* * * * *